United States Patent
Barbaroux et al.

(10) Patent No.: US 12,103,756 B2
(45) Date of Patent: Oct. 1, 2024

(54) FILM COMPRISING A CONTACT LAYER FOR THE WALL OF A SINGLE-USE POUCH

(71) Applicant: SARTORIUS STEDIM FMT SAS, Aubagne (FR)

(72) Inventors: Magali Barbaroux, La Destrousse (FR); Lucie Delaunay, Roquevaire (FR); Ute Husemann, Gottingen (DE); Gerhard Greller, Gottingen (DE)

(73) Assignee: SARTORIUS STEDIM FMT SAS, Aubagne (FR)

( * ) Notice: Subject to any disclaimer, the term of this patent is extended or adjusted under 35 U.S.C. 154(b) by 846 days.

(21) Appl. No.: 14/761,677

(22) PCT Filed: Jan. 17, 2014

(86) PCT No.: PCT/EP2014/050958
§ 371 (c)(1),
(2) Date: Jul. 17, 2015

(87) PCT Pub. No.: WO2014/111549
PCT Pub. Date: Jul. 24, 2014

(65) Prior Publication Data
US 2015/0360843 A1    Dec. 17, 2015

(30) Foreign Application Priority Data
Jan. 18, 2013 (EP) .................... 13305069

(51) Int. Cl.
*B32B 1/02* (2006.01)
*B32B 27/18* (2006.01)
(Continued)

(52) U.S. Cl.
CPC ............ *B65D 81/266* (2013.01); *B32B 27/18* (2013.01); *B32B 27/306* (2013.01); *B32B 27/32* (2013.01);
(Continued)

(58) Field of Classification Search
CPC ......... B32B 1/02; B32B 27/32; B32B 27/306; Y10T 428/1352; Y10T 428/31855; B65D 88/00; B29C 48/00
See application file for complete search history.

(56) References Cited

U.S. PATENT DOCUMENTS

| | | | |
|---|---|---|---|
| 4,429,079 A | 1/1984 | Shibata et al. | |
| 4,552,801 A | 11/1985 | Odorzynski et al. | |
| (Continued) | | | |

FOREIGN PATENT DOCUMENTS

| | | |
|---|---|---|
| CA | 2 600 480 A1 | 9/2006 |
| CA | 2 600 562 A1 | 9/2006 |
| (Continued) | | |

OTHER PUBLICATIONS

Li, H., et al., "High Density Polyethylene and Linear Low Density Polyethylene Blend for Use in the Production of Packaging Film," Guizhou Chemical Industry, vol. 31, No. 3, Oct. 2006, pp. 59-60—with English Translation.

(Continued)

*Primary Examiner* — Marc A Patterson
(74) *Attorney, Agent, or Firm* — NIXON & VANDERHYE

(57) ABSTRACT

A film for manufacturing a pouch includes a contact layer including (A) a copolymer of ethylene and α-olefin having a density in the range of 0.870 g/cm$^3$ to 0.910 g/cm$^3$, alone or in mixture with (B) a polyolefin having a density in the range of 0.910 g/cm$^3$ to 0.940 g/cm$^3$, the contact layer including less than 0.10 wt %, preferably less than 0.07 wt %, of additives able to release a degradation compound further to gamma irradiation in the range of 25 kGy-50 kGy that can slow down or delay cellular growth. The process for manufacturing such a film, as well as the single-use pouch manufactured from that film are also described.

20 Claims, 1 Drawing Sheet

(51) Int. Cl.
  *B32B 27/30* (2006.01)
  *B32B 27/32* (2006.01)
  *B65D 81/26* (2006.01)
  *C08K 5/526* (2006.01)
  *C08L 23/08* (2006.01)

(52) U.S. Cl.
  CPC .......... *C08K 5/526* (2013.01); *C08L 23/0815* (2013.01); *C08L 23/0861* (2013.01); *B32B 2250/05* (2013.01); *B32B 2307/7242* (2013.01); *B32B 2439/40* (2013.01); *B32B 2439/46* (2013.01); *B32B 2439/80* (2013.01); *B32B 2535/00* (2013.01); *C08L 2203/16* (2013.01); *Y10T 428/31938* (2015.04)

(56) References Cited

U.S. PATENT DOCUMENTS

| | | | |
|---|---|---|---|
| 5,085,927 A * | 2/1992 | Dohrer | B32B 27/08 428/220 |
| 5,279,872 A | 1/1994 | Ralph | |
| 5,290,896 A | 3/1994 | Kioka et al. | |
| 5,393,814 A | 2/1995 | Chen | |
| 5,988,422 A | 11/1999 | Vallot | |
| 6,106,935 A | 8/2000 | Lambert et al. | |
| 6,333,061 B1 | 12/2001 | Vadhar | |
| 6,682,825 B1 | 1/2004 | Kennedy et al. | |
| 7,812,094 B2 * | 10/2010 | Kvamme | B32B 27/32 525/240 |
| 7,834,089 B2 | 11/2010 | Zhang | |
| 8,252,397 B2 | 8/2012 | Breck | |
| 8,378,025 B2 | 2/2013 | Botros et al. | |
| 8,815,360 B2 | 8/2014 | Beckwith et al. | |
| 2004/0106723 A1 * | 6/2004 | Yang | C08K 5/01 524/570 |
| 2005/0025918 A1 | 2/2005 | Van Loon et al. | |
| 2006/0147685 A1 * | 7/2006 | Potnis | B32B 5/022 428/212 |
| 2006/0163042 A1 * | 7/2006 | Vogt | B65G 15/34 198/844.1 |
| 2006/0172102 A1 | 8/2006 | Busch et al. | |
| 2006/0286321 A1 * | 12/2006 | Broadus | B32B 27/08 428/35.7 |
| 2007/0054142 A1 | 3/2007 | Lee et al. | |
| 2007/0269623 A1 | 11/2007 | Breck | |
| 2008/0131960 A1 | 6/2008 | Belongia et al. | |
| 2009/0061061 A1 | 3/2009 | Beckwith et al. | |
| 2009/0076214 A1 * | 3/2009 | Kiss | C08F 10/00 524/570 |
| 2009/0156764 A1 | 6/2009 | Malakoff et al. | |
| 2009/0317650 A1 * | 12/2009 | Yang | B32B 27/08 428/523 |
| 2010/0270392 A1 * | 10/2010 | Trent | A01M 1/2077 239/55 |
| 2011/0026360 A1 | 2/2011 | Greller et al. | |
| 2011/0040040 A1 * | 2/2011 | Bornemann | C08L 23/04 525/240 |
| 2011/0136982 A1 * | 6/2011 | Tse | C08L 23/04 525/240 |
| 2012/0022208 A1 | 1/2012 | Pettijohn et al. | |
| 2012/0052225 A1 * | 3/2012 | Kani | C08L 23/0861 428/35.4 |

FOREIGN PATENT DOCUMENTS

| | | |
|---|---|---|
| CA | 2 851 447 A1 | 5/2013 |
| CN | 101795864 A | 8/2010 |
| EP | 0 450 304 A2 | 10/1991 |
| EP | 0 561 428 A1 | 9/1993 |
| EP | 1 122 060 A1 | 8/2001 |
| EP | 1718700 B1 | 8/2012 |
| FR | 2 871 726 A1 | 12/2005 |
| GB | 2 131 739 A | 6/1984 |
| JP | H0994909 A | 4/1997 |
| JP | 10-29283 A | 2/1998 |
| JP | 10-501191 A | 2/1998 |
| JP | H1191045 A | 4/1999 |
| JP | 11-255824 A | 9/1999 |
| JP | 2001-79996 A | 3/2001 |
| JP | 2002105257 A | 4/2002 |
| JP | 2002-310385 A | 10/2002 |
| JP | 2003053915 A | 2/2003 |
| JP | 2003-155059 | 5/2003 |
| JP | 2004315680 A | 11/2004 |
| JP | 2007522327 A | 8/2007 |
| JP | 2008212142 A | 9/2008 |
| JP | 2010527388 A | 8/2010 |
| JP | 2011-006673 A | 1/2011 |
| WO | 94/26816 A1 | 11/1994 |
| WO | 95/26268 A1 | 10/1995 |
| WO | 99/15289 A2 | 4/1999 |
| WO | 00/04131 A1 | 1/2000 |
| WO | 00/13896 A1 | 3/2000 |
| WO | 2004/050353 A2 | 6/2004 |
| WO | 2005/113697 A1 | 12/2005 |
| WO | 2009/032418 A2 | 3/2009 |
| WO | 2009/061061 A1 | 5/2009 |
| WO | 2011/039314 A1 | 4/2011 |
| WO | WO-20090317650 A1 * | 4/2011 |
| WO | 2011/157813 A1 | 12/2011 |

OTHER PUBLICATIONS

Printout from EVAL Grades, retrieved from http://www.evalevoh.com/us/about-eval/eval%E2%84%A2-resins.aspx, Jul. 30, 2019, 1 page.
Product data sheet, Admer NF530E, 3 pages.
Morris, "Reducing Curl in Multilayer Blown Film: Experimental Results, Model Development, and Application to a Cereal Liner Film", Journal of Plastic Film and Sheeting, 2003, vol. 9, pp. 31-54.
Declaration of Conformity for Materials in Food Contact for SURLYN AM7927, dated Jan. 4, 2013, 13 pages.
Samios et al, "Compatibilizat of poly(ethylene-co-vinyl alcohol) (EVOH) and EVOH/HDPE blends with ionomers. Structure and properties" Polymer, 1998, vol. 39, No. 16, pp. 3863-3870.
Hammond et al., "Identification of a Leachable Compound Detrimental to Cell Growth in Single-Use Bioprocess Containers", PDA Journal of Pharmaceutical Science and Technology, Mar.-Apr. 2013, vol. 67, No. 2, pp. 123-134.
Crowson, "The effects of electron beam irradiation on additives present in food-contact polymers.", Thesis, Sheffield Hallam University, Sep. 1991, 266 pages.
Jenke et al., "Accumulation of extractables in buffer solutions from a polyolefin plastic container", International Journal of Pharmaceutics, Jun. 13, 2005, vol. 297, No. 1-2, pp. 120-133.
Shukla et al., "Single-use disposable technologies for biopharmaceutical manufacturing", Trends in Biotechnology, Mar. 2013, vol. 31, No. 3, pp. 147-154.
Japanese Office Action dated Jul. 17, 2018 in corresponding Japanese Patent Application No. 2015-553105 with JPO machine translation of Japanese Office Action.
International Search Report, dated Feb. 17, 2014, from corresponding PCT application.
International Search Report, dated Apr. 28, 2014, from corresponding PCT application.
Hongwu, L., et al., "High Density Polyethylene and Linear Low Density Polyethylene Blend for Use in the Production of Packaging Film," Guizhou Chemical Industry, vol. 31, No. 5, Oct. 2006, pp. 59-62 with English Translation.
Wikipedia, "Polyethylene," Retreived from: https://en.wikipedia.org/w/index.php?title=Polyethylene&oldid=533013936.
Office Action issued in the co-pending U.S. Appl. No. 14/759,662 dated Nov. 2, 2017.
Office Action issued in the co-pending U.S. Appl. No. 14/759,662 dated Jun. 21, 2018.
Office Action issued in the co-pending U.S. Appl. No. 14/759,662 dated Feb. 7, 2019.

(56) References Cited

OTHER PUBLICATIONS

Office Action issued in the co-pending U.S. Appl. No. 14/759,662 dated Aug. 28, 2019.
Office Action issued in the co-pending U.S. Appl. No. 14/759,662 dated Jun. 26, 2020.
Office Action issued in the co-pending U.S. Appl. No. 14/761,530 dated Nov. 17, 2017.
Office Action issued in the co-pending U.S. Appl. No. 14/761,530 dated Jun. 14, 2018.
Office Action issued in the co-pending U.S. Appl. No. 14/761,530 dated Dec. 20, 2018.
Office Action issued in the co-pending U.S. Appl. No. 14/761,530 dated Jun. 18, 2019.
Office Action issued in the co-pending U.S. Appl. No. 14/761,530 dated Jan. 17, 2020.
Office Action issued in the co-pending U.S. Appl. No. 14/761,530 dated Oct. 5, 2020.
Office Action issued in the co-pending U.S. Appl. No. 14/761,530 dated Jun. 3, 2021.
International Search Report, dated Nov. 10, 2014, from corresponding PCT application.

* cited by examiner

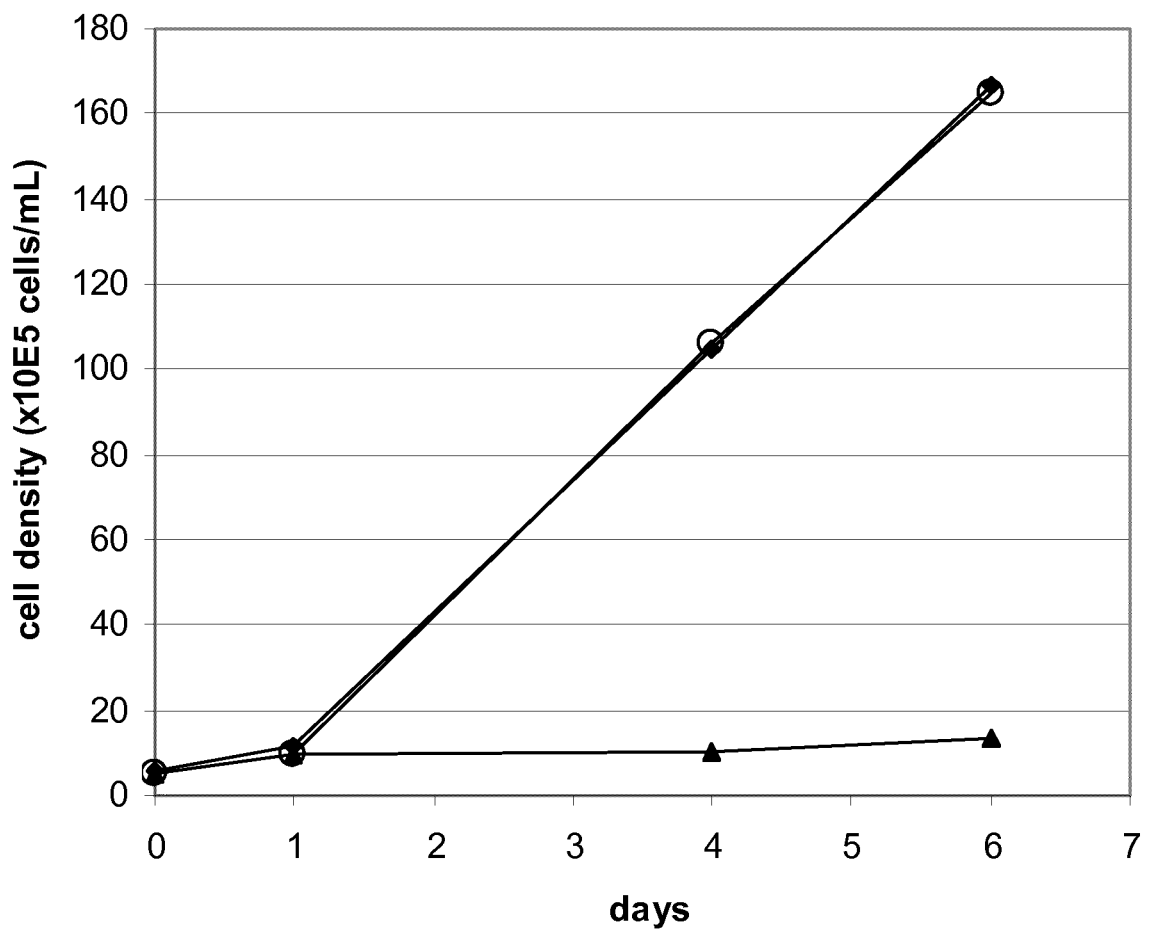

FILM COMPRISING A CONTACT LAYER FOR THE WALL OF A SINGLE-USE POUCH

FIELD OF THE INVENTION

The invention relates to a multilayer film for the wall of a single-use pouch which may be used for preparing, storing or conveying a fluid, such as a cell media or a cell culture, as well as a process for manufacturing such a multilayer film.

The invention is in particular directed to a multilayer film comprising a core layer and an outer layer, both layers being connected one to each other with a tie layer.

The invention also relates to the single-use pouch manufactured from that multilayer film and its process of manufacturing.

BACKGROUND

Single-use pouches are widely used in the field of cell culture, for instance in single-use bioreactors or for storing or conveying cell fluids, such as cell medium or cell culture.

Such pouches may comprise two large walls sealed to one another. Once expanded, they have a limited volume and remain relatively thin, which justifies the fact that they are often called 2D pouches (D meaning dimensions). 3D pouches are also known that comprise two end walls and a side wall that can be folded flat or deployed unfolded, sealed to one another, with the volume able to reach 3,000 liters, and even more. Such 3D pouches are described in the document WO00/04131 or are marketed by the company Sartorius under the trademark FLEXEL® 3D.

The wall of a single-use pouch is generally composed of a multilayer film comprising a contact layer which in contact with the medium that fills the pouch, a barrier layer and an outer layer which is in contact with the external environment of the bag, the three layers being connected one to each other with a tie layer.

The barrier layer provides a barrier to the passage of gases such as oxygen, carbon dioxide and is typically made from ethylene vinyl alcohol (EVOH).

The outer layer contributes to the mechanical strength of the pouch wall. For that purpose, it must be sufficiently flexible to withstand high mechanical stress but not be too much stretchable in order to prevent deformation of the pouch when it is filled with a product.

In the bioreactor field, the various systems mainly differ by their mode of stirring, which may involve a swinging movement, an orbital movement or an axial movement. Mechanical stresses may hence vary significantly from one system to another. In the liquid transport field, the mechanical stresses may also be very high. In both fields, a film which is not able to withstand these mechanical stresses may result in leakage of the product outside the pouch.

Therefore, there is a need for a film which is able to withstand various mechanical stresses in order to be usable in a wide range of applications, such as in bioreactors whatever the mode of stirring, for preparing a solution either by liquid/liquid or solid/liquid stirring, for storing or conveying a fluid in a 2D or 3D pouch, for both small or large volumes. Such a film should also be able to be easily connected with a contact layer suitable for being in contact with biopharmaceutical products without degrading said biopharmaceutical products.

SUMMARY OF THE INVENTION

The invention meets all these needs by providing a multilayer film for a single-use pouch, which shows remarkable mechanical properties, thereby allowing a wide range of applications. Furthermore, the multilayer film of the invention is made from components that can be combined easily according to the required structure, and can be easily connected with a contact layer suitable for biopharmaceutical products.

One object of the present invention is a multilayer film for manufacturing a pouch, said multilayer film comprising:
 a core layer, and
 an outer layer,
wherein:
 the outer layer and the core layer are made integral with a tie layer,
 the core layer comprises (C) an ethylene vinyl alcohol copolymer having a content of ethylene in the range of 25 to 48 mol %, alone or in mixture with (D) an ionomer acid ethylene copolymer,
 the outer layer comprises (E) a polyolefin having a density in the range of 0.910 $g/cm^3$ to 0.940 $g/cm^3$ or (F) a copolymer of ethylene and α-olefin having a density in the range of 0.870 $g/cm^3$ to 0.910 $g/cm^3$, or a mixture thereof,
 the tie layer comprises (G) a copolymer of polyolefin grafted with a carboxylic acid or an anhydride of carboxylic acid, alone or in mixture with (H) a copolymer of polyolefin.

In one embodiment, ethylene vinyl alcohol copolymer (C) is flex-crack resistant.

In one embodiment, copolymer (D) is an acrylic acid copolymer of ethylene ionomer wherein the carboxylate groups are associated with zinc cations.

In one embodiment, polyolefin (E) is a copolymer of ethylene with one or more olefin having from 4 to 8 carbon atoms, in particular a linear low density copolymer of ethylene and hexene.

In one embodiment, copolymer (F) is a plastomer polyolefin having from 4 to 8 carbon atoms, in particular a linear low density copolymer of ethylene and oct-1-ene made from a process utilizing a metallocene catalyst.

In one embodiment, copolymer (G) is a copolymer of ethylene grafted with maleic anhydride.

In one embodiment, copolymer (H) is a plastomer polyolefin having from 4 to 8 carbon atoms, in particular a linear low density copolymer of ethylene and oct-1-ene made from a process utilizing a metallocene catalyst.

In one embodiment, the core layer comprises a mixture of (C) an ethylene vinyl alcohol copolymer having a content of ethylene in the range of 25 to 48 mol % and (D) an ionomer acid ethylene copolymer with a mass ratio (C)/(D) in the range of 95/5 to 55/45, preferably in the range of 10 to 19, more preferably in the range of 15 to 19.

In one embodiment, the outer layer comprises a mixture of (E) and (F) with a mass ratio (E)/(F) more than or equal to 5/95, preferably in the range of 5/95 to 100/0, more preferably in the range of 1 to 5, even more preferably in the range of 1 to 2.5.

In one embodiment, the tie layer comprises a mixture of (G) and (H) with a mass ratio (H)/(G) less than or equal to 95/5, preferably in the range of 5/95 to 95/5, more preferably in the range of range of 0.2 to 5, even more preferably in the range of 0.2 to 2.5.

In one embodiment, the multilayer film further comprises a contact layer suitable for biopharmaceutical products which is made integral with the barrier layer by means of a second tie layer, said contact layer comprising a copolymer of ethylene and α-olefin.

In one embodiment, the multilayer film of the invention further comprises one or several intermediate layers between two of any layers of the film.

Another object of the present invention is a process for manufacturing the multilayer film of the invention, comprising cast coextrusion of the core layer, tie layer and outer layer.

Another object of the present invention is a single-use pouch whose wall comprises the multilayer film of the invention.

Another object of the present invention is a bioreactor comprising the single-use pouch of the invention.

DETAILED DESCRIPTION OF THE INVENTION

Unless otherwise mentioned, the density of polymers referred to in the present application is as measured according to the Standard Test Method ASTM D792-08.

According to the present invention, the expression "made integral with" means that the two layers are attached together either directly or indirectly, i.e. by means of one or several intermediate layers.

Therefore, the multilayer film of the invention may further comprise one or several intermediate layers between two of any layers of the film as defined above. Such intermediate layers may comprise a polymer chosen among one of the following polymers, or a mixture thereof:

- semi-crystalline thermoplastic polyolefins, such as polyethylene (PE), polypropylene (PP), polymethylpentene (PMP), or polybutene-1 (PB-1);
- elastomer polyolefins, such as polyisobutylene (PIB), ethylene-propylene (EPR or EPM), or ethylene-propylene-diene monomere (EPDM);
- Polyisobutylene (PIB);
- Polymers comprising ethylene as a comonomer, such as:
    - ethylene-vinyl acetate (EVA);
    - ethylene copolymers-acrylic esters, such as ethylene-methyl acrylate (EMA), ethylene-ethyl acrylate (EEA);
    - ethylene-acrylic ester-maleic anhydride (EEAMA); or
    - ethylene-polyvinylic alcohol (EVOH).

According to the invention, the expression "a layer comprises X" means that said layer comprises X in any amounts or is substantially composed of X.

Core Layer

According to the present invention, the core layer comprises (C) an ethylene vinyl alcohol copolymer having a content of ethylene in the range of 25 to 48 mol %, alone or in mixture with (D) an ionomer acid ethylene copolymer.

The flex crack resistance is measured according to the Standard Test Method for Flex Durability of Flexible Barrier Materials ASTM F392 (2004). According to the present invention, a material is flex-crack resistant if the number of pine holes measured after 100 cycles according to the method of ASTM F392 (film sample: 30 μm mono layer, test condition: 23° C., Gelbo flex tester: 440° twisting motion) is less than or equal to 30. It was found that the introduction of such a polymer into the core layer makes the multilayer film more resistant to mechanical stresses.

The ethylene vinyl alcohol copolymer (C) having a content of ethylene in the range of 25 to 48 mol % is used to provide a barrier to the passage of gases such as oxygen, carbon dioxide. Ethylene vinyl alcohol copolymers are commonly abbreviated EVOH. Preferably, the content of ethylene in copolymer (C) is in the range of 29 to 44 mol %, most preferably around 29 to 38 mol %. Suitable EVOH whose ethylene content is from 25 to 48 mol % are sold for instance by Nippon Goshei under the trademark SOARNOL®. Suitable EVOH whose ethylene content is from 27 to 48 mol % are sold for instance by Kuraray under the trademark EVAL®.

Advantageously, the copolymer (C) is flex-crack resistant.

Preferably, the flex crack resistant polymer (C) is such that its barrier properties are maintained even during or after torsion or twisting application movements.

The lower the content of ethylene in copolymer (C) is, the higher the gas barrier effect of the layer is, but at the same time the more rigid the core layer is. If the core layer is too rigid, it may crack or cause delamination within the multilayer film.

In order to limit this risk of cracking or delamination, copolymer (C) is mixed with an ionomer acid ethylene copolymer (D) which helps to absorb the mechanical stresses of the barrier layer. The copolymer (D) is particularly suitable because it mixes readily with copolymer (C) and displays good affinity with the tie layers.

By "ionomer acid ethylene copolymer", it is meant acid ethylene copolymer partially neutralized with metal salts such as zinc or sodium ions. Suitable copolymers (D) include acrylic acid copolymers of ethylene ionomers, wherein the carboxylate groups are associated with zinc cations. Such copolymers are sold for instance by DuPont Packaging & Industrial Polymers under the trademark SURLYN® or by The Dow Chemical Company under the trademark AMPLIFY® IO.

The flexibility and gas barrier effect of the film can be controlled by adjusting the proportion between (C) and (D).

In one embodiment, the core layer comprises a mixture of (C) an ethylene vinyl alcohol copolymer having a content of ethylene in the range of 25 to 48 mol % and (D) an ionomer acid ethylene copolymer with a mass ratio (C)/(D) in the range of 95/5 to 55/45.

For a good compromise between flexibility and gas barrier effect, and thus cover a wide range of applications, the mass ratio (C)/(D) may be in the range of 10 to 19, preferably in the range of 15 to 19.

The thickness of the core layer is from 5 μm and 50 μm, preferably from 15 and 40 μm, more preferably from 20 μm and 30 μm.

The core layer may be manufactured by extrusion. Preferably, the core layer is manufactured by cast extrusion with the other layers of the multilayer film, without the use of silicone in order to make the contact layer inert with regard to a cell medium.

Outer Layer

According to the invention, the outer layer comprises (E) a polyolefin having a density in the range of 0.910 g/cm$^3$ to 0.940 g/cm$^3$, or (F) a copolymer of ethylene and α-olefin having a density in the range of 0.870 g/cm$^3$ to 0.910 g/cm$^3$, or a mixture thereof.

Preferably, the polyolefin (E) has a density in the range of 0.925 g/cm$^3$ to 0.940 g/cm$^3$, more preferably a density in the range of 0.930 g/cm$^3$ to 0.940 g/cm$^3$.

Preferably, the copolymer (F) has a density in the range of 0.890 g/cm$^3$ to 0.905 g/cm$^3$, more preferably a density in the range of 0.895 g/cm$^3$ to 0.905 g/cm$^3$.

Polyolefins (E) having a density in the range of 0.910 g/cm$^3$ to 0.940 g/cm$^3$ may be chosen among homopolymers or copolymers of olefins, preferably among copolymers of ethylene. A linear low density copolymer of ethylene is particularly suitable because it shows a better mechanical resistance to tensile stress. Preferred polyolefins (E) include copolymers of ethylene with one or more olefins having at least 3 carbon atoms, preferably from 4 carbon atoms to 8 carbon atoms, such as butene, hexene or octene. Polyolefin (E) is more preferably a linear low density copolymer of ethylene and hexene, commonly referred as LLDPE-C6. Suitable polyolefins (E) are sold for instance by INEOS under the name INEOS LLDPE (more precisely INEOS LLDPE LL6930AA) or by the DOW Chemical Company under the trademark DOWLEX™ (more precisely DOWLEX™ SC 2108G).

Copolymers of ethylene and α-olefin (F) having a density in the range of 0.870 g/cm$^3$ to 0.910 g/cm$^3$ may be chosen among polyolefin plastomers. These resins are made through either the single site or Ziegler-natta catalysis process. They may be chosen in particular among copolymers of ethylene with one or more α-olefins having at least 3 carbon atoms, preferably from 4 carbon atoms to 8 carbon atoms, such as but-1-ene, hex-1-ene or oct-1-ene, more particularly among copolymers of ethylene and octene, ethylene and hexene, ethylene and butene or ethylene and propylene. Copolymer of ethylene and α-olefin (F) is more preferably a linear low density copolymer of ethylene and oct-1-ene made from a process utilizing a metallocene catalyst, commonly referred as mLLDPE-C8. Suitable polyolefins (F) are sold for instance by The Dow Chemical Company under the trademark AFFINITY® or ENGAGE®, or by ExxonMobil Chemical under the trademark EXACT®.

The outer layer contributes to the mechanical strength of the pouch wall. For that purpose, it must be sufficiently flexible to withstand high mechanical stress but not be too much stretchable, i.e. sufficiently rigid, in order to prevent deformation of the pouch when it is filled with a product.

The polyolefin (E) gives to the film the desired rigidity, while copolymer (F) gives to the film the resistance to mechanical strength, in particular resistance to twist stress. The flexibility and rigidity of the film can be controlled by adjusting the right proportion between (E) and (F).

In some applications where the film should be able to resist to the pressure of the liquid contained in the pouch (for instance with high volumes of liquid), it is preferable to have an amount of polyolefin (E) which is higher than copolymer (F).

In other applications, where the film should withstand flexion and mechanical stress, it may be preferable to have an amount of copolymer (F) which is higher than polyolefin (E).

In one embodiment, the outer layer comprises a mixture of (E) and (F) with a mass ratio (E)/(F) higher than or equal to 5/95, preferably in the range of 5/95 to 100/0.

For a good compromise between flexibility and rigidity, and thus cover a wide range of applications, the mass ratio (E)/(F) may be in the range of 1 to 5, preferably in the range of 1 to 2.5.

The outer layer may contain one or more conventional additives to protect the polymers such as antioxydants (-Octadecyl 3-(3,5-di-tert-butyl-4-hydroxyphenyl)propionate-Pentaerythritol tetrakis(3-(3,5-di-tert-butyl-4-hydroxyphenyl)propionate),-Tris(2,4-ditert-butylphenyl)phosphite,-Butylhydroxytoluene,-1,3,5,Tris(3,5-di-tert-butyl-4-hydroxbenzyl)-s-triazine-2,4,6-(1H,3H,5H)trione,-Ethylene bis[3,3-bis[3-(1,1-dimethylethyl)-4-hydroxyphenyl]butanoate]) or to help processing of the layer, such as anti-blocks (such as silicon dioxide, magnesium silicate, calcium carbonate, calcium stearate, ethylene bisstearamide, stearyl erucamide, stearamide, erucamide, glycerol monostearate, zinc stearate, or silicone). Preferably the additives should be compliance with the European pharmacopoeia 6.0, 3.1.3 Polyolefines or 3.1.5 Polyethylene with additives for containers for parenteral preparations and for ophthalmic preparations. Preferably, the amount of the additives in the outer layer should be less than 0.50 wt %, preferably less than 0.10 wt %, more preferably less than 0.07 wt %.

Preferably, the additives are chosen among compositions which do not contain any compound susceptible to degradation under gamma irradiation.

The thickness of the outer layer is from 50 μm and 150 μm, in particular from 55 μm to 150 μm, preferably from 80 and 120 μm, more preferably from 90 μm and 110 μm.

The outer layer may be manufactured by extrusion. Preferably, the outer layer is manufactured by cast extrusion with the other layers of the multilayer film, without the use of silicone in order to make the contact layer inert with regard to a cell medium.

Tie Layer

According to the present invention, the tie layer comprises (G) a copolymer of polyolefin grafted with a carboxylic acid or an anhydride of carboxylic acid, alone or in mixture with (H) a copolymer of polyolefin.

The tie layer is able to seal the contact layer, core layer and outer layer between each other and to prevent separation of these layers during the use of the pouch.

In one embodiment, polyolefin (G) has a density in the range of 0.875 g/cm$^3$ to 0.940 g/cm$^3$.

In one embodiment, polyolefin (H) has a density in the range of 0.870 g/cm$^3$ to 0.910 g/cm$^3$.

The binding properties are conferred by the copolymer (G) which is a copolymer of polyolefin grafted with a carboxylic acid or an anhydride of carboxylic acid. The copolymer of polyolefin grafted with a carboxylic acid or an anhydride of carboxylic acid is preferably a copolymer of ethylene, more particularly a copolymer of ethylene with one or more olefins having at least 3 carbon atoms, preferably from 4 carbon atoms to 8 carbon atoms, such as butene, hexene or octene, grafted with maleic acid anhydride. More preferably, the polymer (G) is a copolymer of ethylene grafted with maleic anhydride. Suitable polymers (G) are sold for instance by Dupont under the trademark BYNEL®, or by The Dow Chemical Company under the trademark AMPLIFY™ TY or AMPLIFY™ GR.

For a better affinity with the core layer and outer layer, and for a better flexibility of the film, the polymer (G) is mixed with copolymer (H).

Copolymer (H) may be chosen among polyolefin plastomers. These resins are made through either the single site or Ziegler-natta catalysis process. They may be chosen in particular among copolymers of ethylene with one or more α-olefins having at least 3 carbon atoms, preferably from 4 carbon atoms to 8 carbon atoms, such as but-1-ene, hex-1-ene or oct-1-ene, more particularly among copolymers of ethylene and octene, ethylene and hexene, ethylene and butene or ethylene and propylene. Copolymer of ethylene and α-olefin (H) is more preferably a linear low density copolymer of ethylene and oct-1-ene made from a process utilizing a metallocene catalyst, commonly referred as mLLDPE-C8. Suitable polyolefins (H) are sold for instance by The Dow Chemical Company under the trademark AFFINITY® or ENGAGE®, or by ExxonMobil Chemical under the trademark EXACT®.

In one embodiment, the tie layer comprises a mixture of (G) and (H) with a mass ratio (H)/(G) less than 95/5, preferably in the range of 5/95 to 95/5.

For a good compromise between flexibility and sealability, and thus cover a wide range of applications, the mass ratio (H)/(G) may be in the range of range of 0.2 to 5, preferably in the range of 0.2 to 2.5.

The thickness of the tie layer is from 5 μm and 50 μm, preferably from 10 and 30 μm, more preferably from 15 μm and 25 μm.

The tie layer may be manufactured by extrusion. Preferably, the tie layer is manufactured by cast extrusion with the other layers of the multilayer film.

Multilayer Film

The multilayer film of the invention comprises a core layer and an outer layer, wherein the contact layer and the core layer are made integral with a tie layer, as defined previously.

In one particular embodiment, the multilayer film of the invention comprises:
a core layer,
an outer layer, and
a tie layer,
wherein:
the outer layer and the core layer are made integral with said tie layer,
the core layer comprises:
a mixture of (C) an ethylene vinyl alcohol copolymer having a content of ethylene in the range of 25 to 48 mol % and (D) an ionomer acid ethylene copolymer, with a mass ratio (C)/(D) in the range of 15 to 19,
the outer layer comprises (E) a linear low density copolymer of ethylene and hexene having a density in the range of 0.930 g/cm$^3$ to 0.940 g/cm$^3$,
the tie layer comprises (G) a copolymer of ethylene grafted with maleic anhydride.

In a preferred embodiment, copolymer (C) of the above defined multilayer film is flex-crack resistant.

In one particular embodiment, the multilayer film of the invention comprises:
a core layer,
an outer layer, and
a tie layer,
wherein:
the outer layer and the core layer are made integral with said tie layer,
the core layer comprises:
(C) a flex-crack resistant ethylene vinyl alcohol copolymer having a content of ethylene in the range of 25 to 48 mol %,
the outer layer comprises (E) a linear low density copolymer of ethylene and hexene having a density in the range of 0.930 g/cm$^3$ to 0.940 g/cm$^3$,
the tie layer comprises (G) a copolymer of ethylene grafted with maleic anhydride.

In another particular embodiment, the multilayer film of the invention comprises:
a core layer,
an outer layer, and
a tie layer,
wherein:
the outer layer and the core layer are made integral with said tie layer,
the core layer comprises:
a mixture of (C) an ethylene vinyl alcohol copolymer having a content of ethylene in the range of 25 to 48 mol % and (D) an ionomer acid ethylene copolymer, with a mass ratio (C)/(D) in the range of 15 to 19,
the outer layer comprises (E) a linear low density copolymer of ethylene and hexene having a density in the range of 0.930 g/cm$^3$ to 0.940 g/cm$^3$,
the tie layer comprises:
a mixture of (G) a copolymer of ethylene grafted with maleic anhydride and (H) a polyolefin plastomer having from 4 to 8 carbon atoms, in particular a linear low density copolymer of ethylene and oct-1-ene made from a process utilizing a metallocene catalyst,
with a mass ratio (H)/(G) in the range of 0.2 to 2.5.

In a preferred embodiment, the copolymer (C) of the above defined multilayer film is flex-crack resistant.

In another particular embodiment, the multilayer film of the invention comprises:
a core layer,
an outer layer, and
a tie layer,
wherein:
the outer layer and the core layer are made integral with said tie layer,
the core layer comprises:
a mixture of (C) an ethylene vinyl alcohol copolymer having a content of ethylene in the range of 25 to 48 mol % and (D) an ionomer acid ethylene copolymer, with a mass ratio (C)/(D) in the range of 15 to 19,
the outer layer comprises:
a mixture of (E) a linear low density copolymer of ethylene and hexene having a density in the range of 0.930 g/cm$^3$ to 0.940 g/cm$^3$ and (F) a polyolefin plastomer having from 4 to 8 carbon atoms, in particular a linear low density copolymer of ethylene and oct-1-ene made from a process utilizing a metallocene catalyst having a density in the range of 0.895 g/cm$^3$ to 0.905 g/cm$^3$,
with a mass ratio (E)/(F) in the range of 1 to 2.5,
the tie layer comprises:
a mixture of (G) a copolymer of ethylene grafted with maleic anhydride and (H) a polyolefin plastomer having from 4 to 8 carbon atoms, in particular a linear low density copolymer of ethylene and oct-1-ene made from a process utilizing a metallocene catalyst,
with a mass ratio (H)/(G) in the range of 0.2 to 2.5.

In a preferred embodiment, the copolymer (C) of the above defined multilayer film is flex-crack resistant.

In another particular embodiment, the multilayer film of the invention comprises:
a core layer,
an outer layer, and
a tie layer,
wherein:
the outer layer and the core layer are made integral with said tie layer,
the core layer comprises:
(C) an ethylene vinyl alcohol copolymer having a content of ethylene in the range of 25 to 48 mol %,
the outer layer comprises:
a mixture of (E) a linear low density copolymer of ethylene and hexene having a density in the range of 0.930 g/cm$^3$ to 0.940 g/cm$^3$ and (F) a polyolefin plastomer having from 4 to 8 carbon atoms, in particular a linear low density copolymer of ethylene and oct-1-ene made from a process utilizing a metallocene catalyst having a density in the range of 0.895 g/cm$^3$ to 0.905 g/cm$^3$,
with a mass ratio (E)/(F) in the range of 1 to 2.5,
the tie layer comprises (G) a copolymer of ethylene grafted with maleic anhydride.

In a preferred embodiment, the copolymer (C) of the above defined multilayer film is flex-crack resistant.

In another particular embodiment, the multilayer film of the invention comprises:

a core layer,
an outer layer, and
a tie layer,
wherein:
the outer layer and the core layer are made integral with said tie layer,
the core layer comprises:
a mixture of (C) an ethylene vinyl alcohol copolymer having a content of ethylene in the range of 25 to 48 mol % and (D) an ionomer acid ethylene copolymer, with a mass ratio (C)/(D) in the range of 15 to 19,
the outer layer comprises (F) a polyolefin plastomer having from 4 to 8 carbon atoms, in particular a linear low density copolymer of ethylene and oct-1-ene made from a process utilizing a metallocene catalyst having a density in the range of 0.895 g/cm$^3$ to 0.905 g/cm$^3$,
the tie layer comprises (G) a copolymer of ethylene grafted with maleic anhydride.

In a preferred embodiment, the copolymer (C) of the above defined multilayer film is flex-crack resistant.

In another particular embodiment, the multilayer film of the invention comprises:
a core layer,
an outer layer, and
a tie layer,
wherein:
the outer layer and the core layer are made integral with said tie layer,
the core layer comprises (C) a flex-crack resistant ethylene vinyl alcohol copolymer having a content of ethylene in the range of 25 to 48 mol % and (D) an ionomer acid ethylene copolymer, with a mass ratio (C)/(D) in the range of 15 to 19,
the outer layer comprises (F) a polyolefin plastomer having from 4 to 8 carbon atoms, in particular a linear low density copolymer of ethylene and oct-1-ene made from a process utilizing a metallocene catalyst having a density in the range of 0.895 g/cm$^3$ to 0.905 g/cm$^3$,
the tie layer comprises (G) a copolymer of ethylene grafted with maleic anhydride.

In one embodiment, the multilayer film of the invention further comprises a contact layer which is made integral with the barrier layer by means of a second tie layer.

In fact, if the multilayer film of the invention is intended for a pouch which is to be filled with a biopharmaceutical product, said multilayer film preferably further comprises a contact layer made from a material that can be in contact with this biopharmaceutical product without causing degradation of the film and of the biopharmaceutical product.

Said contact layer may comprise a copolymer of ethylene and α-olefin, in particular chosen among copolymers of ethylene with one or more α-olefins having at least 3 carbon atoms, preferably from 4 carbon atoms to 8 carbon atoms, such as but-1-ene, hex-1-ene or oct-1-ene, more particularly among copolymers of ethylene and octene, ethylene and hexene, ethylene and butene or ethylene and propylene.

The second tie layer may comprises (G) a copolymer of polyolefin grafted with a carboxylic acid or an anhydride of carboxylic acid, alone or in mixture with (H) a copolymer of polyolefin, as defined previously.

The first and second tie layer may be identical or different in their composition.

In one particular embodiment, the contact layer comprises (A) a copolymer of ethylene and α-olefin having a density in the range of 0.870 g/cm$^3$ to 0.910 g/cm$^3$, alone or in mixture with (B) a polyolefin having a density in the range of 0.910 g/cm$^3$ to 0.940 g/cm$^3$.

Preferably, the copolymer (A) has a density in the range of 0.890 g/cm$^3$ to 0.905 g/cm$^3$, preferably a density in the range of 0.895 g/cm$^3$ to 0.905 g/cm$^3$.

Preferably, the polyolefin (B) has a density in the range of 0.915 g/cm$^3$ to 0.935 g/cm$^3$, preferably a density in the range of 0.920 g/cm$^3$ to 0.930 g/cm$^3$.

Preferably, the contact layer should be made from a material that can be in contact with a biopharmaceutical product without causing degradation of the film and of the biopharmaceutical product.

Furthermore, it must be sealable on itself. For that purpose, a copolymer of ethylene and α-olefin (A) having a density in the range of 0.870 g/cm$^3$ to 0.910 g/cm$^3$ may be chosen among polyolefin plastomers. These resins are made through either the single site or Ziegler-natta catalysis process. They may be chosen in particular among copolymers of ethylene with one or more α-olefins having at least 3 carbon atoms, preferably from 4 carbon atoms to 8 carbon atoms, such as but-1-ene, hex-1-ene or oct-1-ene, more particularly among copolymers of ethylene and octene, ethylene and hexene, ethylene and butene or ethylene and propylene. Copolymer of ethylene and α-olefin (A) is more preferably a linear low density copolymer of ethylene and oct-1-ene made from a process utilizing a metallocene catalyst, commonly referred as mLLDPE-C8.

Suitable copolymers (A) are sold by The Dow Chemical Company under the trademark AFFINITY® or ENGAGE®, or by ExxonMobil Chemical under the trademark EXACT®.

In order to facilitate the processing of the contact layer and decrease its sticking effect, copolymer (A) may be mixed with a polyolefin (B) having a density in the range of 0.910 g/cm$^3$ to 0.940 g/cm$^3$. Polymer (B) may be chosen among homopolymers or copolymers of olefins, preferably among homopolymers of ethylene. Polyolefin (B) is more preferably a low density polymer of ethylene, commonly referred as LDPE. Suitable polyolefins (B) are sold for instance by LyondellBasel Industries under the trademark LUPOLEN® (more precisely LUPOLEN® 2426HK) or The DOW Chemical Company under the name DOW LDPE®.

The flexibility, sealability and sticking effect of the contact layer can be controlled by adjusting the proportion between (A) and (B).

In one embodiment, the contact layer comprises a mixture of (A) and (B) with a mass ratio (B)/(A) less than or equal to 95/5, preferably in the range of 5/95 to 95/5.

For a good compromise between flexibility, sealability and sticking effect, and thus cover a wide range of applications, the mass ratio (B)/(A) may be in the range of 0.2 to 5, preferably in the range of 0.2 to 2.

The contact layer may contain one or more conventional additives to protect the polymers such as antioxydants (-Octadecyl 3-(3,5-di-tert-butyl-4-hydroxyphenyl)propionate-Pentaerythritol tetrakis(3-(3,5-di-tert-butyl-4-hydroxyphenyl)propionate),-Tris(2,4-ditert-butylphenyl)phosphite,-Butylhydroxytoluene,-1,3,5,Tris(3,5-di-tert-butyl-4-hydroxybenzyl)-s-triazine-2,4,6-(1H,3H,5H)trione,-Ethylene bis[3,3-bis[3-(1,1-dimethylethyl)-4-hydroxyphenyl]butanoate]) or to help processing of the layer, such as anti-blocks (such as silicon dioxide, magnesium silicate, calcium carbonate, calcium stearate, ethylene bisstearamide, stearyl erucamide, stearamide, erucamide, glycerol monostearate, zinc stearate, or silicone). Preferably the additives should be compliance with the European pharmacopoeia 6.0, 3.1.3 Polyolefines or 3.1.5 Polyethylene with additives for containers for parenteral preparations and for ophthalmic preparations. Preferably, the amount of the additives in the contact layer should be less than 0.50 wt %, preferably less than 0.10 wt %, more preferably less than 0.07 wt %.

If the contact layer is intended to be in contact with a cell medium, the contact layer should not contain slip agents or phthalate as plasticizers because these additives may contain small molecular weight molecules able to move to the surface of the layer, thereby contaminating the cell medium.

Furthermore, the contact layer should contain no additives or limited amounts (preferably less than 010 wt %, more preferably less than 0.07 wt %) of additives able to release a degradation compound further to gamma irradiation that can slow down or delay cellular growth.

Such degradations compounds may be released from antioxidants. Antioxidants are used to prevent polymer degradation which may be initiated by heat, light, impurities such as catalyst residue, or mechanical stress.

The contact layer preferably contains no antioxidant or limited amounts of antioxidant, less than 0.3 wt % (preferably less than 0.10 wt %, more preferably less than 0.07 wt %). Table 1 provides examples of such oxidants.

TABLE 1

| Chemical name | CAS n° | Chemical formula |
| --- | --- | --- |
| Octadecyl 3-(3,5-di-tert-butyl-4-hydroxyphenyl) propionate | CAS n° 2082-79-3 | 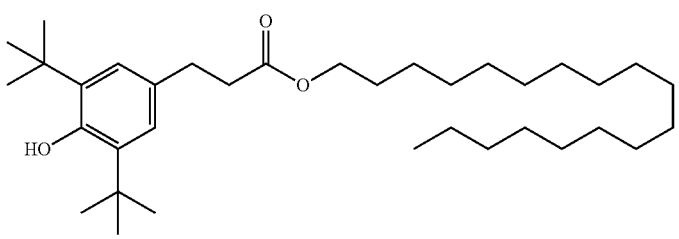 [SMILES: CCCCCCCCCCCCCCCCCCOC(=O)CCc1cc(C(C)(C)C)c(O)c(C(C)(C)C)c1] |
| Pentaerythritol tetrakis(3-(3,5-di-tert-butyl-4-hydroxyphenyl) propionate) | CAS n° 6683-19-8 | 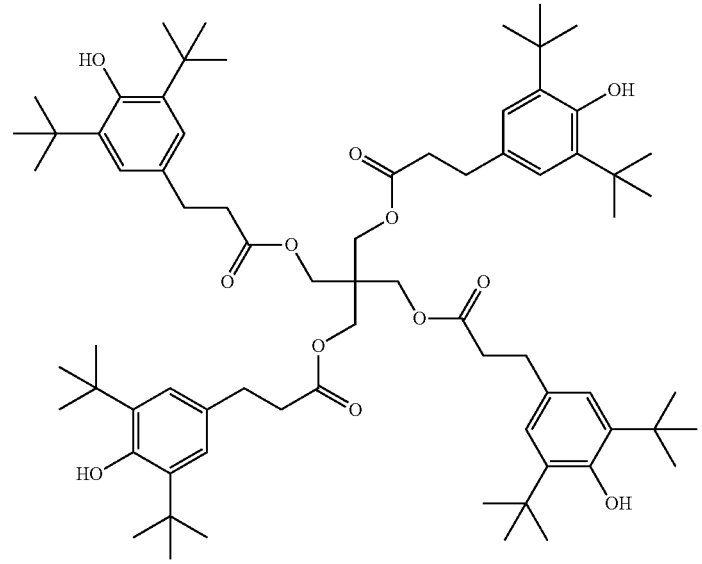 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O] |
| Tris(2,4-ditert-butylphenyl) phosphite | CAS n° 31570-04-4 | 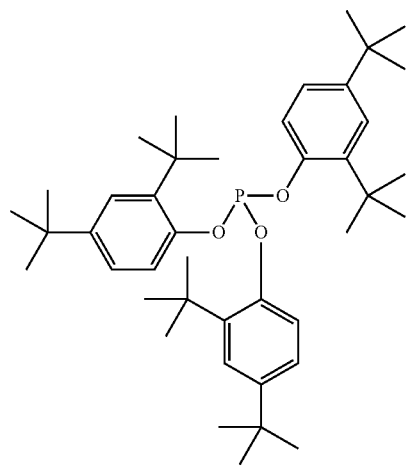 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1] |

TABLE 1-continued

| Chemical name | CAS n° | Chemical formula |
| --- | --- | --- |
| Butylhydroxytoluene | CAS n° 128-37-0 | |
| 1,3,5,Tris(3,5-di-tert-butyl-4-hydroxybenzyl)-s-triazine-2,4,6-(1H,3H,5H)trione | CAS n° 27676-62-6 | |
| Ethylene bis[3,3-bis[3-(1,1-dimethylethyl)-4-hydroxyphenyl] butanoate] | CAS n° 32509-66-3 | |

The antioxidants are classified into two types, primary and secondary, depending on the mechanism used to halt the degradation process. Degradation compounds able to slow down or delay cellular growth can be released from primary and secondary antioxidants, such as phenolic antioxidants or phosphite antioxidant.

In particular, the contact layer contains no or limited amounts (preferably less than 0.01 wt %) of a secondary antioxidant, more preferably of a phosphite antioxidant.

The thickness of the contact layer is from 150 µm and 300 µm, preferably from 200 and 250 µm, more preferably from 225 µm and 245 µm.

The contact layer may be manufactured by extrusion. Preferably, the contact layer is manufactured by cast extrusion with the other layers of the multilayer film, without the use of silicone in order to make the contact layer inert with regard to a cell medium.

The invention does not encompass a multilayer film comprising:

a core layer, and an outer layer, wherein:

the core layer is composed of an ethylene vinyl alcohol copolymer having a content of ethylene in the range of 25 to 45 mol %, the outer layer is composed of a polyolefin, such as an ethylene α-olefin copolymer, especially an ethylene-butene-1 copolymer, commonly referred to as ultra-low density polyethylene.

The layers as described above may be processed into a multilayer film by standard extrusion techniques well known by the person skilled in the art including extrusion or coextrusion such as cast or blow extrusion, extrusion coating, extrusion coating and lamination or a combination thereof, for instance by co-extruding at least two layers and then coating on another layer, or by coextruding at least two layers, extruding another layer and then coating and laminating the coextruded layer and extruded layer together.

Preferably, the multilayer film is manufactured by using a cast coextrusion process.

Another object of the present invention is thus a process for manufacturing the multilayer film as described above, comprising cast coextrusion of the contact layer, first tie layer, core layer, second tie layer and outer layer.

The process should be conducted free of slip agents and other low molecular weight additives that may increase the extractables to an unacceptable level.

The multilayer film according to the invention is particularly suited for manufacturing single-use pouches, including 2D pouches or 3D pouches.

Another object of the present invention is thus a single-use pouch whose wall comprises the multilayer film as described above.

For that purpose, the thickness of the multilayer film is from 200 μm and 500 μm, preferably from 300 and 450 μm, more preferably from 350 μm and 450 μm.

The multilayer film of the invention is able to withstand various mechanical stresses making it usable in a wide range of applications, such as in bioreactors whatever the mode of stirring, for preparing a solution either by liquid/liquid or solid/liquid stirring, for storing or conveying a fluid in a 2D or 3D pouch, for both small or large volumes.

Such pouches may be manufactured according to standard techniques well known by the person skilled in the art.

The invention will now be further described in the following examples. These examples are offered to illustrate the invention and should in no way be viewed as limiting the invention.

Example 1: Multilayer Film

A multilayer film with a thickness of 400 μm was prepared and coextruded in accordance with the teaching of the present invention. The multilayer film has:
- an outer layer with a thickness of 100 μm comprising 98 wt % of LLDPE-C6 having a density of 0.936 g/cm$^3$ and 2 wt % of an anti-block resin,
- a core layer with a thickness of 25 μm comprising 95 wt % of EVOH having an ethylene contain of 38% mol and 5 wt % of PE ionomer zinc having a density of 0.950 g/cm$^3$,
- a contact layer with a thickness of 235 μm comprising 68 wt % of mLLDPE-C8 having a density of 0.902 g/cm$^3$, 30 wt % of LDPE without additives having a density of 0.923 g/cm$^3$ and 2 wt % of an anti-block resin,
- a first tie layer between the contact layer and the core layer, said tie layer comprising 70 wt % of mLLDPE-C8 having a density of 0.902 g/cm$^3$ and 30 wt % LLDPE-MAH,
- a second tie layer between the contact layer and the core layer, said tie layer comprising 70 wt % of mLLDPE-C8 having a density of 0.902 g/cm$^3$ and 30 wt % of LLDPE-MAH.

LLDPE-C6=linear low density copolymer of ethylene and hexene.
EVOH=ethylene vinyl alcohol polymer.
PE ionomer zinc=acrylic acid copolymers of ethylene ionomer, wherein the carboxylate groups are associated with zinc cations.
mLLDPE-C8=linear low density copolymer of ethylene and oct-1-ene made from a process utilizing a metallocene catalyst.
LLDPE-MAH=linear low density copolymer of ethylene grafted with maleic anhydride.
LDPE=low density polymer of ethylene.

Example 2: Mechanical Stress Tests 2.1. Stirring Table with Orbital Movement

A 2D pouch made with the multilayer film of example 1 (film No. 1), having a volume of 10 liters was filled with 10 liters of water and placed on a stirring table having an orbital movement. The stirring speed was 140 rpm. The test was performed until leakage of the fluid out of the pouch. Leakage occurred after 1.1 hours (standard deviation=0.3).

The same 2D pouch made with the same multilayer film as the one of film No. 1, except that the core layer contained EVOH flex-crack resistant having a density of 1.12 g/cm$^3$ (film No. 2), was tested under the same conditions. Leakage occurred after 1.5 hours (standard deviation=0.3).

The same 2D pouch made with the same multilayer film as the one of film No. 2, except that the outer layer contained 30 wt % of mLLDPE-C8 having a density of 0.902 g/cm$^3$ (film No. 3), 68 wt % of LLDPE-C6 having a density of 0.936 g/cm$^3$ and 2 wt % of an anti-block resin, was tested under the same conditions. Leakage occurred after 2.1 hours (standard deviation=0.7).

This example shows that the use of a flex-crack resistant EVOH into the core layer makes the film be more resistant to mechanical stress (time until leakage is increased by 36%).

This example further shows that the addition of a copolymer of ethylene and α-olefin of low density (in the range of 0.870 g/cm$^3$ to 0.910 g/cm$^3$, in particular of 0.902 g/cm$^3$) to a polyolefin having a higher density into the outer layer makes the film be even more resistant to mechanical stress (time until leakage is increased by 40%).

The use of a flex-crack resistant EVOH into the core layer and the addition of a copolymer of ethylene and α-olefin of low density into the outer layer increases the time until which leakage occurs by 90%.

2.2. Rocking Motion

Three pouches having a volume of 200 liters were made with film No. 1, film No. 2 and film No. 3 as described above, were filled with 100 liters of water and moved under a speed of 20 rpm and an angle of 10°. The test was performed during 21 days.

Regarding the pouch made with film No. 1, leakage occurred after 5 days.

Regarding the pouch made with film No. 2 and 3, no leakage occurred after 21 days.

This example corroborates the results obtained in example 2.1).

The invention claimed is:

1. A film for manufacturing a pouch, said film comprising:
a contact layer comprising (A) a copolymer of ethylene and α-olefin having a density in the range of 0.870 g/cm$^3$ to 0.905 g/cm$^3$, in mixture with (B) a homopolymer of ethylene having a density in the range of 0.910 g/cm$^3$ to 0.940 g/cm$^3$, said contact layer comprising less than 0.10 wt % of additives able to release a degradation compound further to gamma irradiation in the range of 25 kGy-50 kGy, that can slow down or delay cellular growth,
wherein the film is a sterilized film and is configured to be manufactured as the pouch,
wherein an amount of anti-block in the contact layer is less than or equal to 2 wt %,
wherein the contact layer is sealable on itself, and
wherein the contact layer is configured to contact with a biopharmaceutical product without causing degradation of the biopharmaceutical product.

2. The film according to claim 1, wherein the additives configured to release a degradation compound further to gamma irradiation that can slow down or delay cellular growth are antioxidants.

3. The film according to claim 2, wherein said antioxidants are phosphite antioxidants.

4. The film according to claim 2, wherein said antioxidants are tris(2,4-ditert-butylphenyl) phosphites.

5. The film according to claim 1, wherein the copolymer of ethylene and α-olefin (A) is a plastomer copolymer of ethylene with one or more α-olefins having from 4 carbon atoms to 8 carbon atoms.

6. The film according to claim 1, wherein the contact layer comprises a mixture of (A) and (B) with a mass ratio (B)/(A) less than or equal to 95/5.

7. The film according to claim 1, wherein said film is monolayer.

8. The film according to claim 1, wherein said film is a multilayer film comprising a core layer configured to provide a barrier to the passage of gases such as oxygen or carbon dioxide, and an outer layer,
   wherein the contact layer and core layer are made integral with a first tie layer, and the outer layer and the core layer are made integral with a second tie layer in addition to the contact layer.

9. A process for manufacturing the film according to claim 1, comprising:
   extruding the contact layer.

10. A process for manufacturing the multilayer film according to claim 8, comprising:
    coextruding the contact layer, the first tie layer, the core layer, the second tie layer, and the outer layer.

11. A single-use pouch comprising:
    a wall comprising the film according to claim 1.

12. A bioreactor comprising:
    the single-use pouch according to claim 11.

13. The film according to claim 1, wherein said contact layer comprises less than 0.07 wt % of additives able to release a degradation compound further to gamma irradiation in the range of 25 kGy-50 kGy, that can slow down or delay cellular growth.

14. The film according to claim 5, wherein the copolymer of ethylene and α-olefin (A) is a linear low density copolymer of ethylene and oct-1-ene made from a process utilizing a metallocene catalyst.

15. The film according to claim 1, wherein the polyolefin (B) is a low density polymer of ethylene.

16. The film according to claim 1, wherein said film is a multilayer film comprising one or several layers in addition to the contact layer.

17. The film according to claim 1, wherein the anti-block in the contact layer is selected from the group consisting silicon dioxide, magnesium silicate, calcium carbonate, calcium stearate, ethylene bisstearamide, stearyl erucamide, stearamide, erucamide, glycerol monostearate, zinc stearate, and silicone.

18. The film according to claim 1, wherein the contact layer comprises a mixture of (A) and (B) with a mass ratio (B)/(A) in a range of 0.2 to 5.

19. The film according to claim 18, wherein the range is 0.2 to 2.

20. The film according to claim 8, wherein the core layer comprises one of: a flex-crack resistant ethylene vinyl alcohol copolymer, and a mixture of an ethylene vinyl alcohol copolymer and an ionomer acid ethylene copolymer.

* * * * *